(12) United States Patent
Haruna

(10) Patent No.: US 8,908,519 B2
(45) Date of Patent: Dec. 9, 2014

(54) SCTP COMMUNICATION METHOD

(75) Inventor: Tsuneomi Haruna, Tokyo (JP)

(73) Assignee: NEC Corporation, Tokyo (JP)

( * ) Notice: Subject to any disclaimer, the term of this patent is extended or adjusted under 35 U.S.C. 154(b) by 643 days.

(21) Appl. No.: 13/144,824

(22) PCT Filed: Jan. 19, 2010

(86) PCT No.: PCT/JP2010/000268
§ 371 (c)(1),
(2), (4) Date: Jul. 15, 2011

(87) PCT Pub. No.: WO2010/082509
PCT Pub. Date: Jul. 22, 2010

(65) Prior Publication Data
US 2012/0020375 A1    Jan. 26, 2012

(30) Foreign Application Priority Data
Jan. 19, 2009   (JP) ................ P2009-009201

(51) Int. Cl.
| H04L 12/26 | (2006.01) |
| H04J 3/16 | (2006.01) |
| G06F 15/16 | (2006.01) |
| H04L 12/911 | (2013.01) |
| H04L 12/801 | (2013.01) |
| H04L 12/917 | (2013.01) |
| H04L 29/08 | (2006.01) |
| H04L 12/913 | (2013.01) |
| H04L 12/927 | (2013.01) |
| H04L 29/06 | (2006.01) |

(52) U.S. Cl.
CPC .............. *H04L 47/10* (2013.01); *H04L 47/726* (2013.01); *H04L 47/76* (2013.01); *H04L 69/326* (2013.01); *H04L 47/724* (2013.01); *H04L 47/801* (2013.01); *H04L 69/14* (2013.01)
USPC ........................... 370/235; 370/465; 709/231

(58) Field of Classification Search
None
See application file for complete search history.

(56) References Cited

U.S. PATENT DOCUMENTS 5,862,325 A * 1/1999 Reed et al. .............. 709/201
2004/0015937 A1 * 1/2004 Martinez et al. ............ 717/167

(Continued)

FOREIGN PATENT DOCUMENTS

| JP | H06197151 A | 7/1994 |
| JP | 2001197118 A | 7/2001 |

(Continued)

OTHER PUBLICATIONS

Stewart, R., RFC 4960: Stream Control Transmission Protocol, Network Working Group, Sep. 2007.*

(Continued)

*Primary Examiner* — Faruk Hamza
*Assistant Examiner* — Cassandra Decker
(74) *Attorney, Agent, or Firm* — Sughrue Mion, PLLC

(57) ABSTRACT

In an SCTP communication system including a plurality of nodes in which communication is conducted via an association established using at least one stream between nodes, upon detecting the occurrence of a vacant stream or a surplus stream and upon receiving an additional request message describing the additionally requested number of streams, each node sends back an additional acknowledgement message to a counterpart node so as to change the number of streams used for an association between these nodes. That is, by dynamically changing the number of streams used between nodes without causing an intermittent break in communication, it is possible to effectively utilize the number of streams in large-scale communication, and it is therefore possible to improve communication speed.

8 Claims, 9 Drawing Sheets

(56) References Cited

U.S. PATENT DOCUMENTS

2004/0037297 A1* 2/2004 Ishida et al. ............. 370/395.54
2006/0123110 A1* 6/2006 Dolganow et al. ............ 709/225

FOREIGN PATENT DOCUMENTS

| JP | 2004535133 A | 11/2004 |
| JP | 2006279851 A | 10/2006 |
| JP | 2009111641 A | 5/2009 |

OTHER PUBLICATIONS

Stewart, R., et al., RFC 5061: Stream Control Transmission Protocol (SCTP) Dynamic Address Reconfiguration, Network Working Group, Sep. 2007.*
Japanese Office Action for JP2010-546606 mailed on Dec. 18, 2012.
International Search Report for PCT/JP2010/000268 mailed Apr. 20, 2010.
R. Stewart et al., "Stream Control Transmission Protocol (SCTP) Stream Reset", draft-stewart-tsvwg-sctpstrrst-00.txt, Network Working Group, Internet-Draft, IETF, Jun. 20, 2008.

* cited by examiner

SCTP COMMUNICATION METHOD

This application is the National Phase of PCT/JP2010/000268, filed Jan. 19, 2010, which claims priority on Japanese Patent Application No. 2009-9201 filed Jan. 19, 2009, the entire content of which is incorporated herein by reference.

TECHNICAL FIELD

The present invention relates to SCTP (Stream Control Transmission Protocol) communication methods applied to communication systems including a plurality of nodes, and in particular to procedures for allocating the number of streams used for each association established in each node.

BACKGROUND ART

Recently, various types of SCTP communication methods have been developed, wherein Patent Document 1 discloses a transport layer protocol supporting multi-homing. Herein, a multi-home host has a plurality of network interfaces, providing a plurality of IP addresses with arbitrarily designated addresses. Additionally, the SCTP supports multi-streaming.

The conventional SCTP statically allocates the number of streams used for each association, so that the number of streams which is determined upon establishment of each association is continuously used until disconnection of communication. A procedure for allocating the number of streams will be described with reference to FIG. 13.

FIG. 13 shows a procedure for allocating the number of streams with SCTP nodes (hereinafter, simply referred to as "nodes") by way of steps ST301 to ST303. In step ST301, the node X making a request of connection sends INIT (Initiation) to the node Y.

In step ST302, the node Y receiving INIT sends back INIT_ACK (Initiation Acknowledgment) to the node X.

In step ST303, the node X compares the requested number of streams OS (Number of Outbound Streams), described in the received INIT_ACK, with the permitted number of streams MIS (Number of Inbound Streams), thus determining the number of streams, i.e. the minimum one selected from among these numbers. The requested number of streams OS is the number of streams which needs to be used in each association, whilst the permitted number of streams MIS is the maximum number of streams which each node can accept.

According to this procedure, communication is started using the number of streams determined upon establishment of each association; thereafter, the number of streams is maintained without being changed until disconnection of communication.

When the number of streams requested by the node X is "5" while the number of streams permitted by the node Y is "3", for example, communication is started using three streams as shown in FIG. 14.

Next, the relationship between the number of streams, which is set between nodes, and the communication speed (i.e. the communication speed in an application layer) will be described. The SCTP makes a delivery acknowledgement of packets in units of streams, so that packets are retransmitted when they are lost. For this reason, it is impossible to transmit packets following retransmitted packets in each stream involving retransmission of packets.

Compared with the communication method using a single stream, the communication method using a plurality of streams is advantageous in that it can continue transmitting packets in other streams other than each stream involving retransmission of packets. That is, it is expected that the data communication speed in the application layer will be improved by using a plurality of streams.

In the communication method using a plurality of streams, however, a transmission delay increases due to retransmission of packets so that the communication speed will decrease when the amount of data is far larger than the number of streams. Considering the tradeoff between the number of streams and the processing ability allocated to each stream, it is necessary to determine the maximum number of streams adopted in each node. That is, each node needs to efficiently allocate the limited number of streams to each association.

PRIOR ART DOCUMENT

Patent Document

Patent Document 1: Japanese Patent Publication No. 2004-535133

DISCLOSURE OF INVENTION

Problem to be Solved by the Invention

As described above, the conventional SCTP communication method statically allocates the number of streams, which is determined upon establishment of each association, to each node so as to maintain it until disconnection of communication, wherein it is impossible to change the number of streams in response to a request by an application or a variation of a communication condition. For this reason, the conventional SCTP communication method suffers from a problem in that even when a stream occurs in the middle of communication, the communication speed cannot be increased using the stream.

Next, this problem will be described in detail.

A first example will be described with reference to FIGS. 15 and 16. Herein, communication is conducted among three nodes K, L, M, wherein the node L undergoes the upper-limit value of five (MIS=5) as the number of available streams, and wherein the node K sends INIT to the node L to request using three streams (OS=3), so that the node L accepts such a request to establish an association.

Next, the node M sends INIT to the node L to request using three streams (OS=3). At this time, the number of streams available for the node L is MIS=5−3=2, so that the number of streams adopted for establishment of an association between the node L and the node M is limited to "2". That is, the node M, which requests using three streams, is allowed to use two streams, which eventually increases the amount of data flowing through each stream, so that the communication speed between the nodes L and M decreases.

Thereafter, upon exiting an application between the nodes K and L as shown in FIG. 16, an association established between these nodes is no longer used and released. At this time, three streams adopted in communication between the nodes K and L are assumed to be vacant streams, which can be used for other nodes. In this case, it is possible to increase the communication speed by allocating the newly available streams to an association between the nodes L and M.

However, the conventional SCTP communication method statically allocates the number of streams, which is determined upon establishment of an association, to each stream and maintains it until disconnection of communication; hence, the conventional SCTP communication method cannot change allocation of streams in the middle of communication. This maintains a situation in which numerous data continuously flow through a small number of streams allocated to an association between the nodes L and M, thus maintaining the slow communication speed. That is, even when vacant streams occur due to an ending of communication in another node, the conventional SCTP communication method cannot utilize newly available streams so that the communication speed cannot be increased.

Next, a second example will be described with reference to FIGS. 17 and 18. Herein, communication is conducted between three nodes P, Q, R, wherein the node Q undergoes the upper-limit value of five (MIS=5) as the number of available streams. As shown in FIG. 17, an association is established using three streams between the nodes P and Q, while another association is established using two streams between the nodes Q and R. At this time, it is assumed that numerous data flow through each stream between the nodes P and Q, and numerous data flow through each stream between the nodes Q and R.

Thereafter, as shown in FIG. 18, the amount of data flowing between the nodes P and Q decreases so that one stream is adequately sufficient for communication between these nodes. In this case, it is possible to increase the communication speed by allocating two streams, which become surplus to an association between the nodes P and Q, to an association between the nodes Q and R.

However, in the conventional SCTP communication method, the number of streams cannot be changed in the middle of communication, so that a low communication speed must be maintained between the nodes Q and R. That is, even when surplus streams occur in other nodes, the conventional SCTP communication method cannot utilize newly available streams so that the communication speed cannot be increased.

As described above, the conventional SCTP communication method statically allocates the number of streams, which is determined upon initiation, to each node and maintains it until disconnection of communication; hence, the conventional SCTP communication method is unable to dynamically change the number of streams and unable to increase the communication speed by effectively utilizing vacant streams which occur due to a request by an application or a variation of a communication condition.

The present invention is made under the foregoing circumstances and aims to dynamically update the number of streams used for an association established between nodes, and wherein this invention aims to provide an SCTP communication method which improves the communication speed by effectively utilizing streams, which significantly affect the communication speed in large-scale communication.

Means for Solving the Problem

According to an SCTP communication method of the present invention applied to a communication system including a plurality of nodes, each node receives INIT, describing the requested number of streams, so as to send back INIT_ACK describing the permitted number of streams so that an association is established using at least one stream with a counterpart node, wherein upon detecting the occurrence of a vacant stream, each node receives an additional request message, describing the additionally requested number of streams, so as to send back an additional acknowledgement information, thus changing the number of streams used for the association with the counterpart node.

An SCTP communication system of the present invention establishes an association using at least one stream between a plurality of nodes in a communication system. Each node includes a first transmitter that sends INIT describing the requested number of streams, a second transmitter that, upon reception of INIT, sends back INIT_ACK describing the permitted number of streams, and a controller that, upon detecting the occurrence ea vacant stream and upon receiving an additional request message describing the additionally requested number of streams, sends back an additional acknowledgement message so as to change the number of streams used for the association established with a counterpart node.

Each node involving the present invention is based on the STC.P communication method which establishes an association using at lease one stream. It includes a first transmitter that sends INIT describing the requested number of streams, a second transmitter that, upon reception of INIT, sends back INIT_ACK describing the permitted number of streams, and a controller that, upon detecting the occurrence of a vacant stream and upon receiving an additional request message describing the additionally requested number of streams, sends back an additional acknowledgement message so as to change the number of streams used for the association established with a counterpart node.

Effect of the Invention

According to the present invention, it is possible to dynamically change the number of streams, used for an association established between nodes, without disconnecting communication. Thus, it is possible to improve the communication speed by effectively utilizing the number of streams in the large-scale communication.

MODE FOR CARRYING OUT THE INVENTION

The embodiments of the present invention will be described with reference to the drawings.

Embodiment 1

Figure 1:
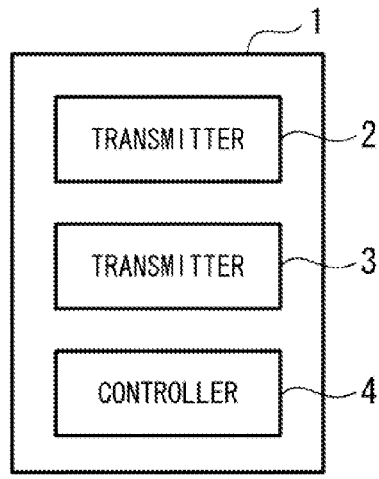
[FIG. 1] A block diagram showing the configuration of a node included in a communication system adopting an SCTP communication method according to Embodiment 1 of the present invention.

FIG. 1 is a block diagram showing the configuration of a node 1 included in a communication system adopting an SCTP communication method according to Embodiment 1 of the present invention. Herein, the node 1 includes a first transmitter 2, a second transmitter 3, and a controller 4.

The first transmitter 2 is used for establishing an SCTP link (i.e. "an association") between nodes, wherein it transmits INIT (Initiation), describing a communication start request and the requested number of streams OS, to a counterpart node.

The second transmitter 3 is used for establishing an SCTP association between nodes, wherein upon receiving INIT from a counterpart node, it sends back INIT_ACK (Initiation Acknowledgement), describing the permitted number of streams MIS, to the counterpart node.

The controller 4 controls communication with the counterpart node with the minimum number of streams determined based on the requested number of streams OS and the permitted number of streams MIS. Upon detecting vacant streams, the controller 4 notifies another node of the number of vacant streams. When another node sends back the additionally requested number of streams as a reply to the notification, the controller 4 calculates the minimum number of streams based on the number of vacant streams and the additionally requested number of streams, thus dynamically changing the number of streams used for communication with another node.

In this connection, the controller 4 may independently control the first transmitter 2 so as to transmit the number of vacant streams to another node in the predetermined time period. Alternatively, the controller 4 may independently control the second transmitter 3 so as to make another node transmit the additionally requested number of streams.

The communication system includes a plurality of nodes 1, which mutually communicate with each other upon establishing SCTP associations. In this sense, the node 1 starts communication upon determining the number of streams used for each association.

Next, the details of the SCTP communication method according to Embodiment 1 will be described with reference to FIGS. 2 to 6.

Figure 2:
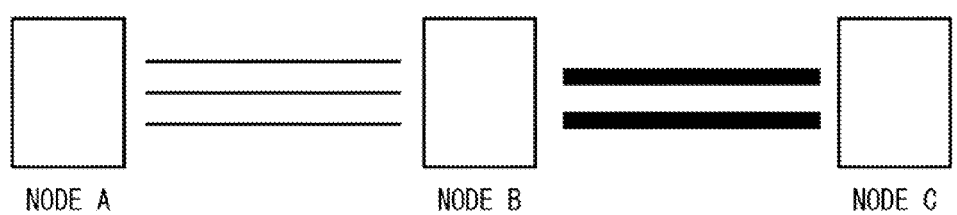
[FIG. 2] An illustration of communication conducted between three nodes A, B, C establishing associations therebetween.

FIG. 2 shows the situation in which three nodes (i.e. nodes A, B, C), each having the same configuration as the node I, are connected together. Herein, the upper-limit value for the number of streams available to the node B, i.e. the permitted number of streams MIS, is set to "5" (where MIS=5). First, the node A sends INIT, describing a request for three streams (where OS=3), to the node B, which in turn accepts the request and establishes an association. Next, the node B sends INIT, describing a request for three streams (where OS=3), to the node C. However, the number of streams available to the node B is calculated as "5"–"3"="2" (i.e. MIS=2); hence, the number of streams available to an association between the nodes B and C is limited to "2".

Figure 3:
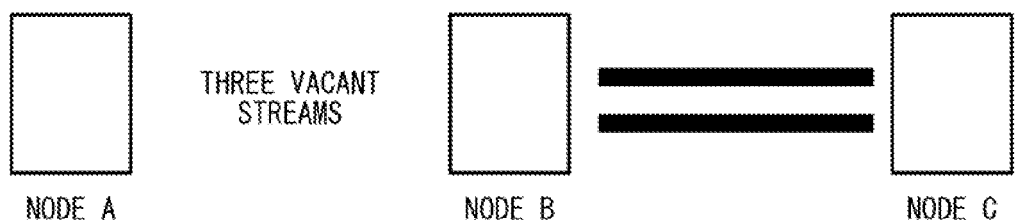
[FIG. 3] An illustration regarding a state in which the association between nodes A, B in FIG. 2 is released.
Figure 4:
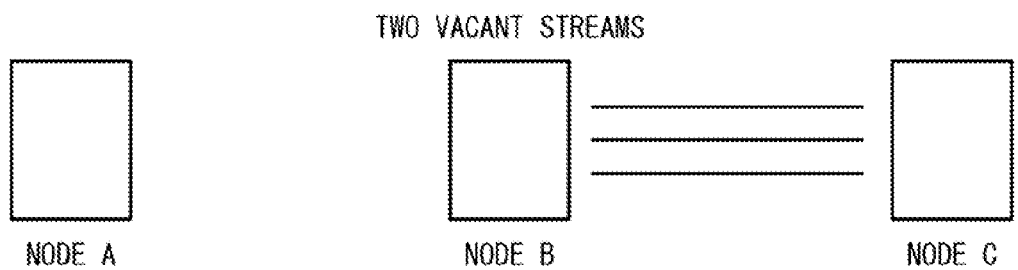
[FIG. 4] An illustration regarding a state in which vacant streams, which occur in FIG. 3, are allocated to nodes B, C.

Thereafter, as shown in FIG. 3, an application is ended so as to discard the association between the nodes A and B; hence, the association is released. That is, three streams, which have been used between the nodes A and B, are currently vacant. In this case, Embodiment 1 implements a stream allocating procedure shown in FIG. 5, so that vacant streams, which occur due to the release of an association, are allocated to another association. As a result, as shown in FIG. 4, the number of streams used between the nodes B and C is changed from "2" to "3"; this makes it possible to increase the communication speed between these nodes.

Figure 5:
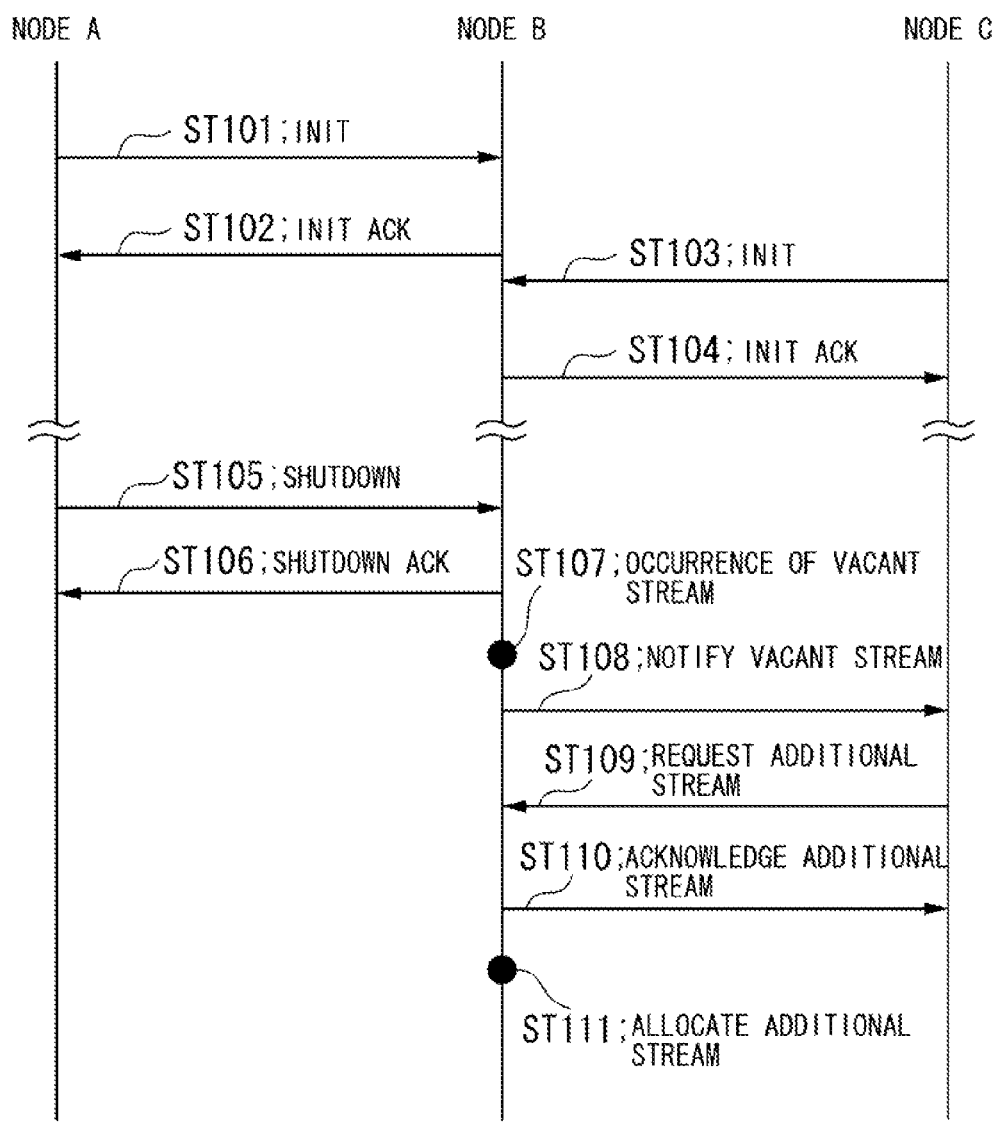
[FIG. 5] A sequence diagram illustrating a procedure for detecting vacant streams, which occur in FIGS. 2 to 4, and allocating them to another node.
Figure 6:
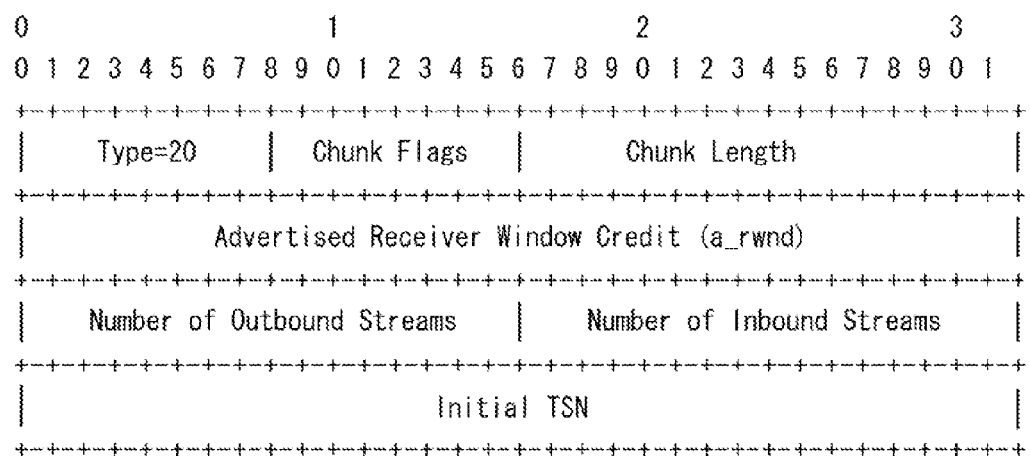
[FIG. 6] An illustration of a packet format of a vacancy occurrence message representing the occurrence of vacant streams.

FIG. 5 is a sequence diagram showing a procedure in which vacant streams, which occur due to the release of an association, are allocated to another association in the SCTP communication method of Embodiment 1. That is, FIG. 5 shows a procedure for changing the number of streams assigned to each of an association between nodes A, B and an association between nodes B, C in the situation in which three nodes A, B, C are connected together, and the node B involves the permitted number of streams MIS, which is set to "5" (i.e. MIS=5).

Step ST101: The node A sends INIT, describing a request for the desired number of streams applied to an association, to the node B. Herein, the requested number of streams OS, delivered from the node A to the node B, is set to "3" (i.e. OS=3).

Step ST102: As a reply to INIT received in step ST101, the node B sends back INIT_ACK, describing the upper-limit value for the number of streams, to the node A. Herein, the node B indicates the permitted number of streams MIS, which is set to "5" (i.e. MIS=5). The node A receives INIT_ACK notifying MIS=5. Thus, it is possible to establish an association using three streams between the nodes A and B as shown in FIG. 2.

Step ST103: The node C sends INIT, describing a request for the desired number of streams applied to an association, to the node B. Herein, the requested number of streams OS, send from the node C to the node B, is set to "3" (i.e. OS=3).

Step ST104: As a reply to INIT received in step ST103, the node B sends back INIT_ACK, describing the upper-limit value for the number of streams, to the node C. In this case, the node B indicates the permitted number of streams MIS "5" while three streams have been used in communication with the node A, so that the node B notifies the node C of the upper-limit value "2" (i.e. MIS=2) for the available number of streams. The node C receives INIT_ACK notifying MIS=2. Thus, the node C is forced to establish an association using two streams, the number of which is smaller than the requested number of streams OS=3, with the node B as shown in FIG. 2.

Step ST105: When an association between the nodes A and B is no longer used due to an ending of an application, the node A sends SHUTDOWN, describing the release of the association, to the node B.

Step ST106: As a reply to SHUTDOWN received in step ST105, the node B sends back SHUTDOWN_ACK to the node A. As a result, three associations, which have been used in the association between the nodes A and B, become vacant as shown in FIG. 3.

Step ST107: The node B acknowledges that three vacant streams occur due to the release of the association between the nodes A and B. That is, the node B recognizes that three streams, which have been used in communication with the node A, are currently vacant.

Step ST108: The node B notifies the node C of a vacancy occurrence message representing the occurrence of vacant streams. This vacancy occurrence message describes the number of vacant streams "3" (i.e. MIS=3). Specifically, the node B sends the vacancy occurrence message, with the packet format shown in FIG. 6, to the node C. This message describes MIS=3, representing the number of vacant streams, in the record "Number of Outbound Streams".

Step ST109: Upon receiving this message in step ST108, the node C makes a decision as to whether or not to increase the number of streams in an association with the node B. Since the node C is permitted to use two streams in the notification from the node B in step ST104 irrespective of the requested number of streams OS=3 sent to the node B in step ST103, the node C decides to increase the number of streams. The node C sends an additional request message, describing the additionally requested number of streams OS=3 with the same packet format of INIT, to the node B. Compared to INIT in step ST103 intended for establishment of an association between the nodes B and C, the additional request message intends to change the available number of streams while maintaining the existing association; hence, the additional request message should be a different type of message compared to INIT. That is, the value of Type (used for identifying the type of each message), described in the packet format of the additional request message, differs from the value of Type described in the packet format of INIT.

Step ST110: Upon receiving the additional request message in step ST109, the node B sends an additional acknowledgement message, representing the upper-limit value for the currently available number of streams, to the node C. Since three vacant streams occur in step ST107, the node B notifies the node C of the permitted number of streams MIS=3. The additional acknowledgement message employs the same packet format as INIT_ACK. This is likened to the foregoing operation in which the additional request message employs the same packet format as INIT. That is, the additional acknowledgement message differs from INIT_ACK in terms of the value of Type.

Step ST111: An additional stream is allocated in communication between the nodes B and C. Thus, it is possible to change the number of streams from "2" to "3" without causing an intermittent break in the association between the nodes B and C as shown in FIG. 4.

In this connection, it is possible to transfer a vacancy occurrence message in the predetermined time period irrespective of the foregoing operation in which the node B sends a vacancy occurrence message to the node C at the timing of detecting the occurrence of vacant streams with the node A. Alternatively, each node may simultaneously send a vacant occurrence message, representing the occurrence of vacant streams, when transmitting data to another node.

Embodiment 2

Next, an SCTP communication method according to Embodiment 2 of the present invention will be described. Similar to Embodiment 1, Embodiment 2 employs the same configuration of the node 1 but different functionality. Embodiment 2, the controller 4 of the node 1 calculates the number of surplus streams based on the current amount of communication and the available number of streams, so that the calculated number of surplus streams is regarded as the number of vacant streams and notified to another node. The other functions of Embodiment 2 are identical to those of Embodiment 1.

Next, the details of the SCTP communication method according to Embodiment 2 will be described with reference to FIGS. 7 to 11.

Figure 7:
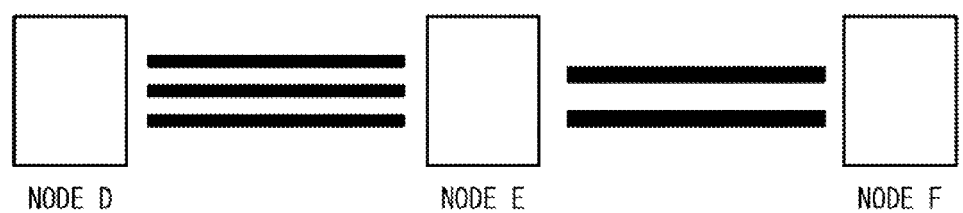
[FIG. 7] An illustration of an SCTP communication method according to Embodiment 2 of the present invention, in which associations are established between three nodes D, E, F.

As shown in FIG. 7, three nodes D, E, F are connected together, wherein the node E is subjected to the upper-limit value for the available number of streams, i.e. the permitted number of streams MIS, which is set to "5" (i.e. MIS=5). First, the node D sends INIT, describing a request for three streams (i.e. OS=3), to the node E, which in turn accepts the requested number of streams OS so as to establish an association. Next, the node F sends INIT, describing a request for three streams (i.e. OS=3), to the node E, whereas the number of streams used for an association established between the nodes E and F is limited to "2" since the node E is subjected to the available number of streams "2" (i.e. MIS=2).

Figure 8:
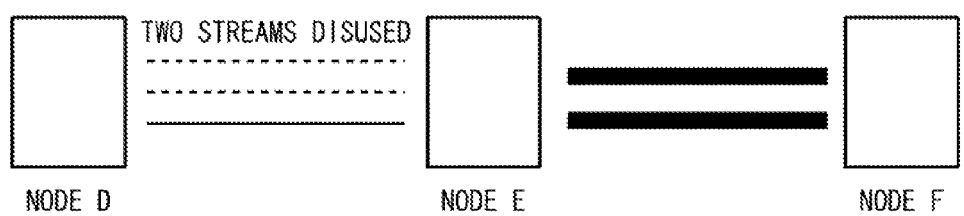
[FIG. 8] An illustration regarding a state in which the number of streams used for nodes D, E decreases.
Figure 9:
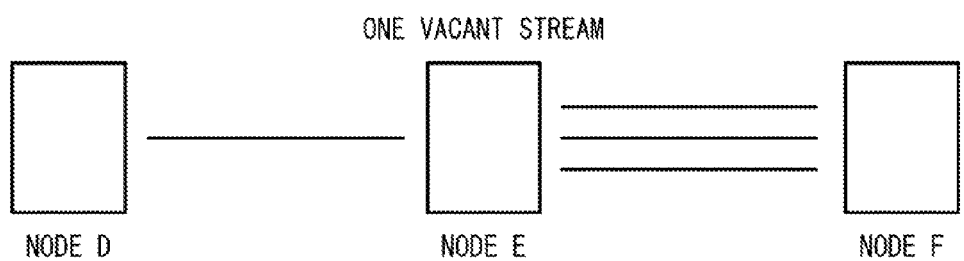
[FIG. 9] An illustration regarding a state in which surplus streams, which occur in FIG. 8, are recognized as vacant streams and allocated to nodes E, F.

Thereafter, the amount of data flowing between the nodes D and E decreases so that a single stream is adequately sufficient for communication between these nodes as shown in FIG. 8. In this case, Embodiment 2 implements a procedure for allocating the number of streams shown in FIG. 10, whereby it is possible to utilize surplus streams as vacant streams and allocate them to the node F without releasing an association between the nodes D and E. As a result, it is possible to change the number of streams used in communication between the nodes E and F as shown in FIG. 9, thus increasing the communication speed between these nodes.

Figure 10:
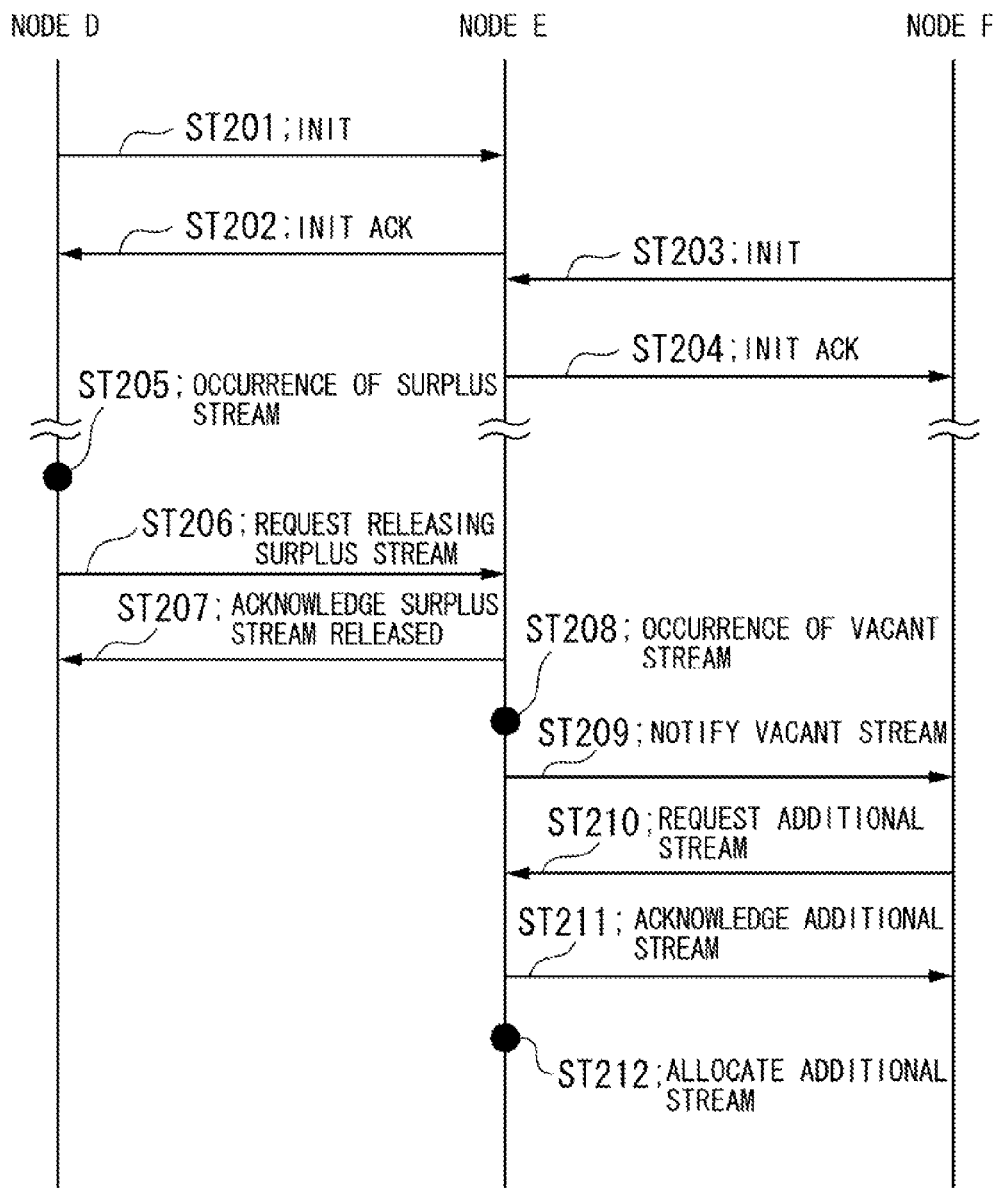
[FIG. 10] A sequence diagram illustrating a procedure for detecting surplus streams, as shown in FIGS. 7 to 9, and allocating them to another node.
Figure 11:
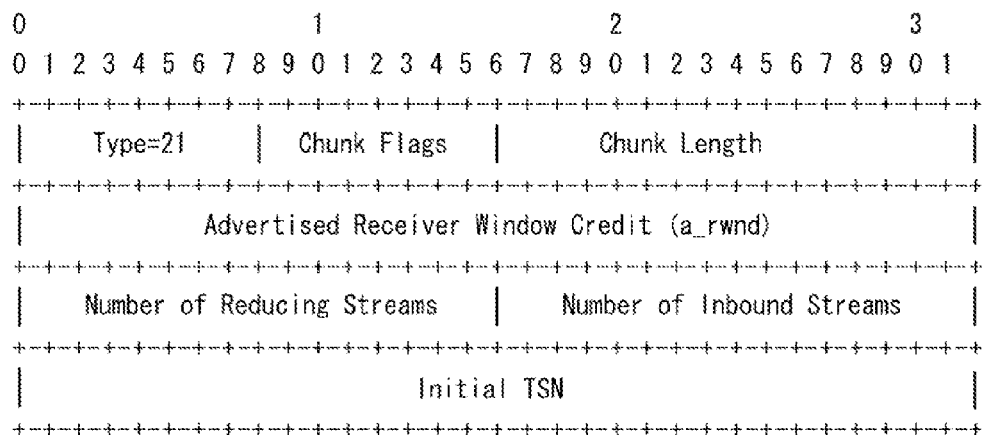
[FIG. 11] An illustration of a packet format of a release request message requesting release of surplus streams.

FIG. 10 is a sequence diagram showing a procedure for recognizing surplus streams, which occur when the number of streams used for each association decreases, as vacant streams and allocating them to another association in the SCTP communication method of Embodiment 2.

Step ST201: The node D sends INIT, describing a request for the desired number of streams used for an association, to the node E. Herein, the node D notifies the node E of the requested number of streams OS, which is set to "3" (i.e. OS=3).

Step ST202: As a reply to INIT received in step ST201, the node E sends back INIT_ACK, describing the upper-limit value for the number of streams, to the node D. Herein, the node E notifies the node D of the permitted number of streams MIS, which is set to "5" (i.e. MIS=5). When the node D receives INIT_ACK, the node D, an association is established using three streams between the nodes D and E as shown in FIG. 7.

Step ST203: The node F sends INIT, describing a request for the desired number of streams used for an association, to the node E. Herein, the node F notifies the node E of the requested number of streams OS, which is set to "3" (i.e. OS=3).

Step ST204: As a reply to INIT received in step ST203, the node E sends back INIT_ACK, describing the upper-limit value for the available number of streams, to the node F. Since the node E is subjected to the upper-limit value "5" for the number of streams and conducts communication with the node D by use of three streams, the upper-limit number for the available number of streams is limited to "2". When the node F receives INIT_ACK describing the permitted number of streams MIS=2, an association is established using two streams between the nodes E and F as shown in FIG. 7.

Step ST205: When the amount of data flowing between the nodes D and E decreases so that a single stream is adequately sufficient for communication, two streams are disused between these nodes as shown in FIG. 8. That is, an application of the node D, which initially makes a communication request with the requested number of streams OS=3, recognizes two surplus streams in step ST205.

Step ST206: The node D sends a release request message to the node E in order to release the recognized surplus streams. Herein, the release request message describes the current number of surplus streams RS=2. Specifically, the release request message is created with the packet format shown in FIG. 11, in which "2" is described in the record regarding the number of surplus streams RS (Number of Reducing Streams).

Figure 12:
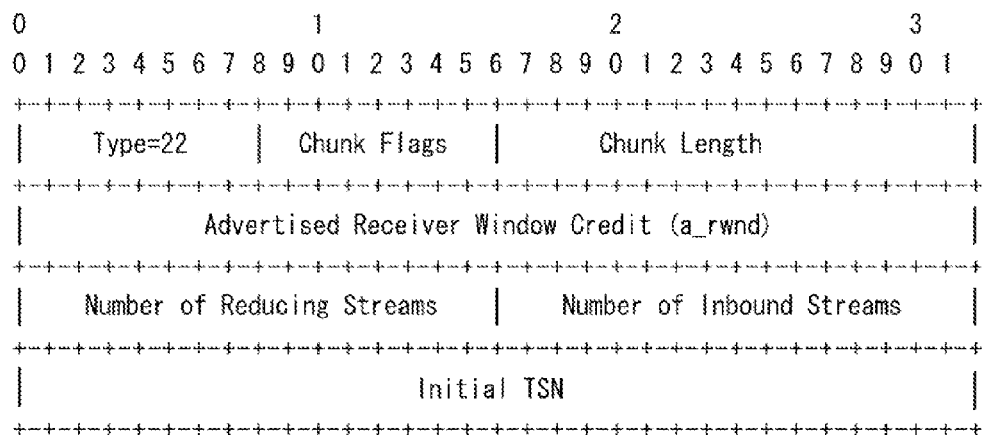
[FIG. 12] An illustration of a packet format of a release acknowledgement message indicating the number of surplus streams newly allocated.
Figure 13:
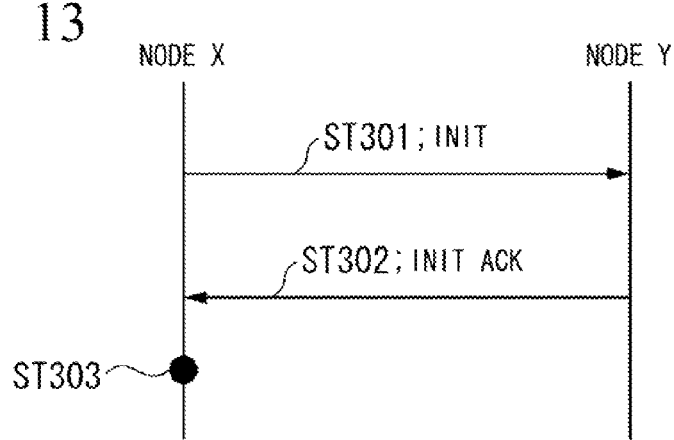
[FIG. 13] A sequence diagram illustrating a procedure for allocating the number of streams used for an association established between nodes in the conventional SCTP communication method.
Figure 14:
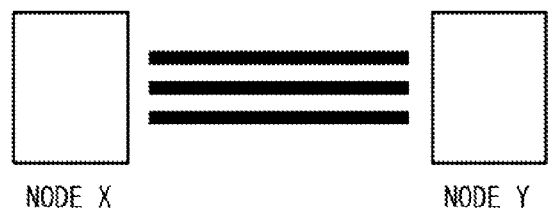
[FIG. 14] An illustration regarding a state in which an association is established using three streams between nodes X, Y.
Figure 15:
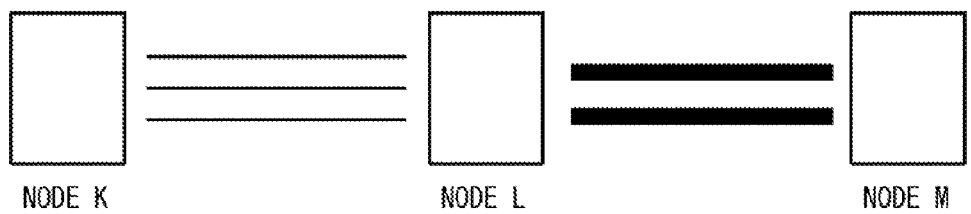
[FIG. 15] An illustration regarding a first example of the conventional SCTP communication method in which nodes K, M conduct communication with a node L with the available number of streams "5".
Figure 16:
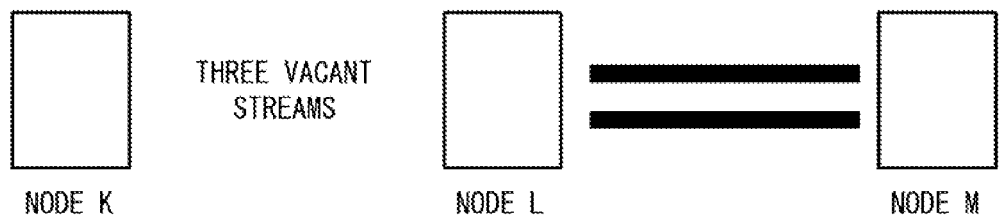
[FIG. 16] An illustration regarding a state in which three streams become available due to an end of communication between nodes K, L in FIG. 15.
Figure 17:
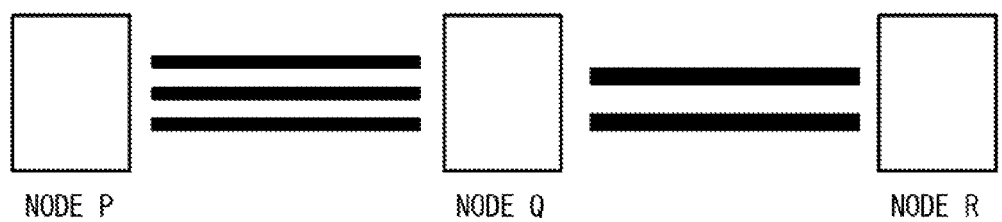
[FIG. 17] An illustration regarding a second example of the conventional SCTP communication method in which nodes P, R conduct communication with a node Q with the available number of streams "5".
Figure 18:
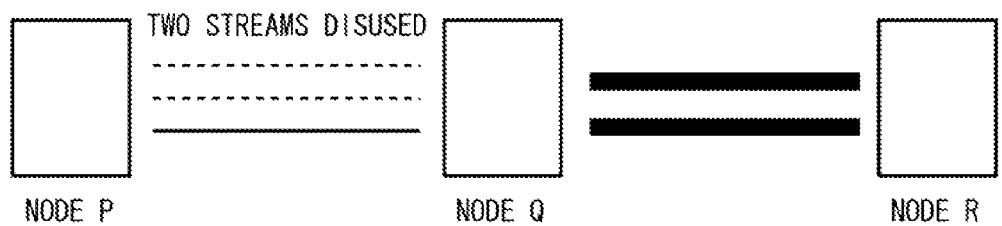
[FIG. 18] An illustration regarding a state in which two streams are disused in communication between nodes P, Q in FIG. 17.

Step ST207: Upon receiving the release request message in step ST206, the node E sends back a release acknowledgement message to the node D in order to confirm the released number of surplus streams. Herein, the newly allocated number of surplus streams is described in the release acknowledgement message. Specifically, the release acknowledgement message is created with the packet format shown in FIG. 12, in which the newly allocated number of surplus streams is described in the record regarding the number of surplus streams RS (Number of Reducing Streams).

Step ST208: Upon receiving the release acknowledgement message, the node D releases surplus streams alone while maintaining an association using remaining streams, thus continuing communication with the node E. The node E detects the occurrence of vacant streams in step ST108.

Step ST209: The node E sends a vacancy occurrence message, representing the occurrence of vacant streams, to the node F. In this connection, it is possible to transfer a vacancy occurrence message in the predetermined time period. Herein, the vacancy occurrence message describes the current number of vacant streams.

Step ST210: Upon receiving the vacancy occurrence message in step ST209, the node F makes a decision as to whether or not to increase the number of streams used for an association with the node E. Since the node E allows the node F to use two streams in step ST204 regardless of a request for three streams in step ST203, the node F decides to increase the number of streams. For this reason, the node F sends an additional request message, describing the additionally requested number of streams OS=3, to the node E in order to additionally request a third stream.

Step ST211: Upon receiving the additional request message in step ST210, the node E sends back an additional acknowledgement message, representing the upper-limit value for the available number of streams, to the node F. Thus, it is possible to increase the number of streams from "2" to "3" without causing an intermittent break in the association between the nodes E and F as shown in FIG. 9.

As described above, the STCP communication method of the present invention is able to distribute vacant streams to another association when detecting a variation of the number of streams in the middle of communication between nodes; thus, it is possible improve the communication speed without disconnection of communication.

The present invention is not necessarily limited to the foregoing embodiments; hence, this invention may embrace various modifications within the scope of the invention as defined in claims.

INDUSTRIAL APPLICABILITY

This invention is essentially applied to the communication system based on the SCTP in which communication is conducted using associations established between a plurality of nodes, but the present invention is applicable to other node-to-node communication systems based on other communication protocols.

DESCRIPTION OF THE REFERENCE NUMERALS

1 Node
2 First transmitter
3 Second transmitter
4 Controller

The invention claimed is:

1. An SCTP communication method comprising:
receiving a first request comprising a first requested number of streams;
sending a first acknowledgment comprising a first permitted number of streams, wherein the first permitted number of streams is less than or equal to the first requested number of streams;
establishing an association comprising a first plurality of streams, wherein the first plurality of streams equals the first permitted number of streams; and
detecting a vacant stream;
determining a surplus number of streams based on a current amount of communication and a total number of available streams;
receiving a second request comprising a second requested number of streams based on the surplus number of streams, wherein the second requested number of streams is greater than the first number of permitted streams;
sending a second acknowledgement comprising a second permitted number of streams based on the surplus number of streams, wherein the second number of permitted streams is greater than the first permitted number of streams; and
changing the association, wherein the changed association comprises the second permitted number of streams.

2. The SCTP communication method according to claim 1, further comprising sending the surplus number of streams to at least one associated node, wherein the surplus number of streams indicates a number of vacant streams.

3. The SCTP communication method according to claim 1, wherein at least one associated node is notified of the surplus number of steams within a threshold time of detecting the vacant stream.

4. The SCTP communication method according to claim 1, wherein at least one associated node is notified of the surplus number of steams at a predetermined timing.

5. The SCTP communication method according to claim 1, wherein at least one associated node is notified of the surplus number of steams at an arbitrary time.

6. An SCTP communication system comprising:
a first transmitter configured to send a first request comprising a first requested number of streams;
a second transmitter configured to send a first acknowledgment comprising a first permitted number of streams, wherein the first permitted number of streams is less than or equal to the first requested number of streams; and a controller configured to:

detect a vacant stream; and determine a surplus number of streams based on a current amount of communication and a total number of available streams;

the second transmitter configured further to receive a second request comprising a second requested number of streams based on the surplus number of streams, wherein the second requested number of streams is greater than the first number of permitted streams; and send a second acknowledgement comprising a second permitted number of streams based on the surplus number of streams, wherein the second number of permitted streams is greater than the first permitted number of streams;

the controller configured further to change the association, wherein the changed association comprises the second permitted number of streams.

7. The SCTP communication system according to claim 6, wherein the second transmitter is further configured to send the surplus number of streams to the first transmitter, wherein the surplus number of streams indicates a number of vacant streams.

8. A node for SCTP communication comprising:

a transmitter configured to:

receive a first request comprising a first requested number of streams;

send a first acknowledgment comprising a first permitted number of streams, wherein the first permitted number of streams is less than or equal to the first requested number of streams;

a controller configured to:

establish an association comprising a first plurality of streams, wherein the first plurality of streams equals the first permitted number of streams;

detect a vacant stream;

determine a surplus number of streams based on a current amount of communication and a total number of available streams;

the transmitter configured further to:

send a surplus number of streams based on the detection of a vacant stream and based on the surplus number of streams; and receive a second request comprising a second requested number of streams based on the surplus number of streams;

send a second acknowledgement comprising a second permitted number of streams based on the surplus number of streams, wherein the second number of permitted streams is greater than the first permitted number of streams; the controller configured further to:

change the association, wherein the changed association comprises the second permitted number of streams.

* * * * *